E. J. Serpas
INVENTOR.

Oct. 24, 1939.  E. J. SERPAS  2,177,045
ROTARY INTERNAL COMBUSTION ENGINE
Filed July 2, 1937  8 Sheets-Sheet 5

E. J. Serpas
INVENTOR.

Oct. 24, 1939.    E. J. SERPAS    2,177,045
ROTARY INTERNAL COMBUSTION ENGINE
Filed July 2, 1937    8 Sheets-Sheet 7

E. J. Serpas
INVENTOR.

Patented Oct. 24, 1939

2,177,045

UNITED STATES PATENT OFFICE 2,177,045

ROTARY INTERNAL COMBUSTION ENGINE

Ernest J. Serpas, New Orleans, La., assignor of two-fifths to J. S. Waterman, New Orleans, La.

Application July 2, 1937, Serial No. 151,568

8 Claims. (Cl. 123—43)

My invention relates to improvements in rotary internal combustion engines particularly of the two cycle type and wherein an annular piston chamber, divided into equally spaced segments, is rotatably mounted on a stationary crank shaft and provided to carry pistons in an annular course.

An important object is that the invention relates to and is a modification of my pending application, Serial No. 111,091 filed November 16, 1936.

Further objects of my invention are, first, to provide a simple combination of connecting rods and toggle joint links for connecting the pistons to the crank shaft and to the annular casing whereby to produce the torque and the necessary piston action in order that charging and discharging of the firing chambers occur in pairs simultaneously and made to fire likewise at every half turn of the engine; second, the elimination of the intake and exhaust valves and consequently a great number of parts; third, a novel means for supplying fresh charges of fuel mixture to the firing chambers through the action of centrifugal force; fourth, the location of the intake and exhaust ports in the walls of the firing chambers, so that they be most efficient in charging and discharging of the firing chambers; fifth, a novel muffler means which acts to muffle and evacuate the exhaust gases from the firing chambers; sixth, simplified means for lubricating the wearing parts; and seventh, the accessibility of all parts.

Figure 1:
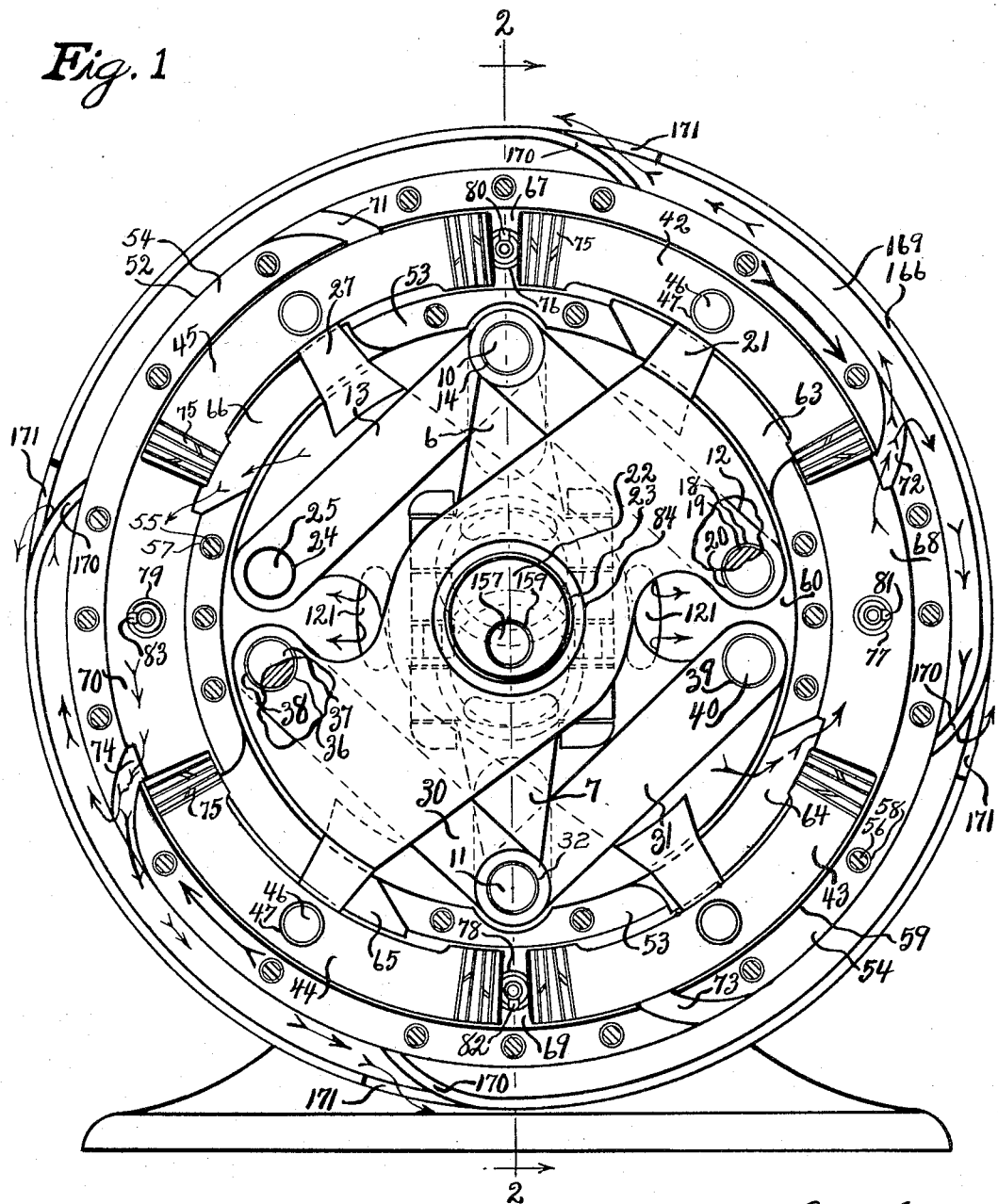
Figure 2:
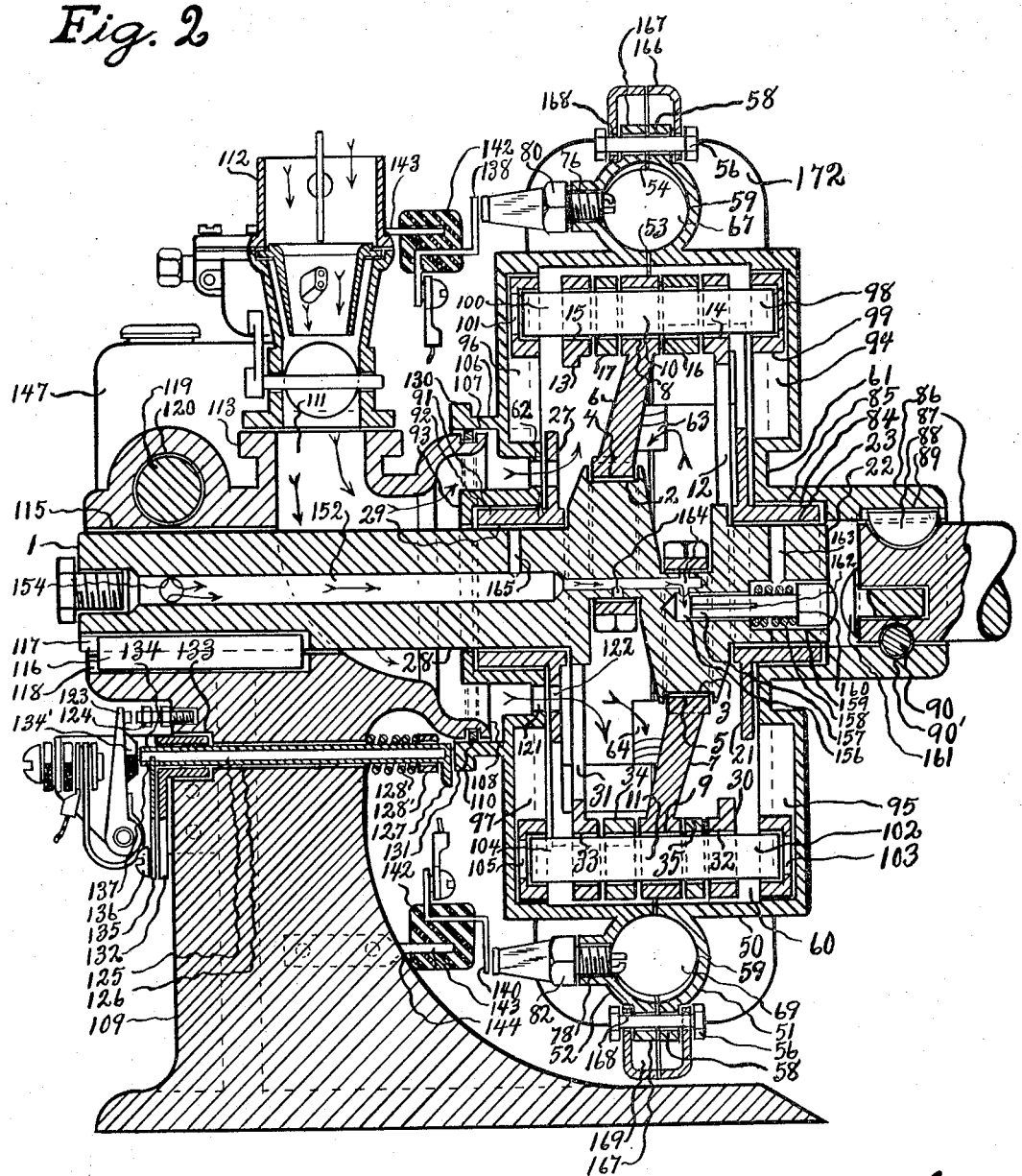
Figure 3:
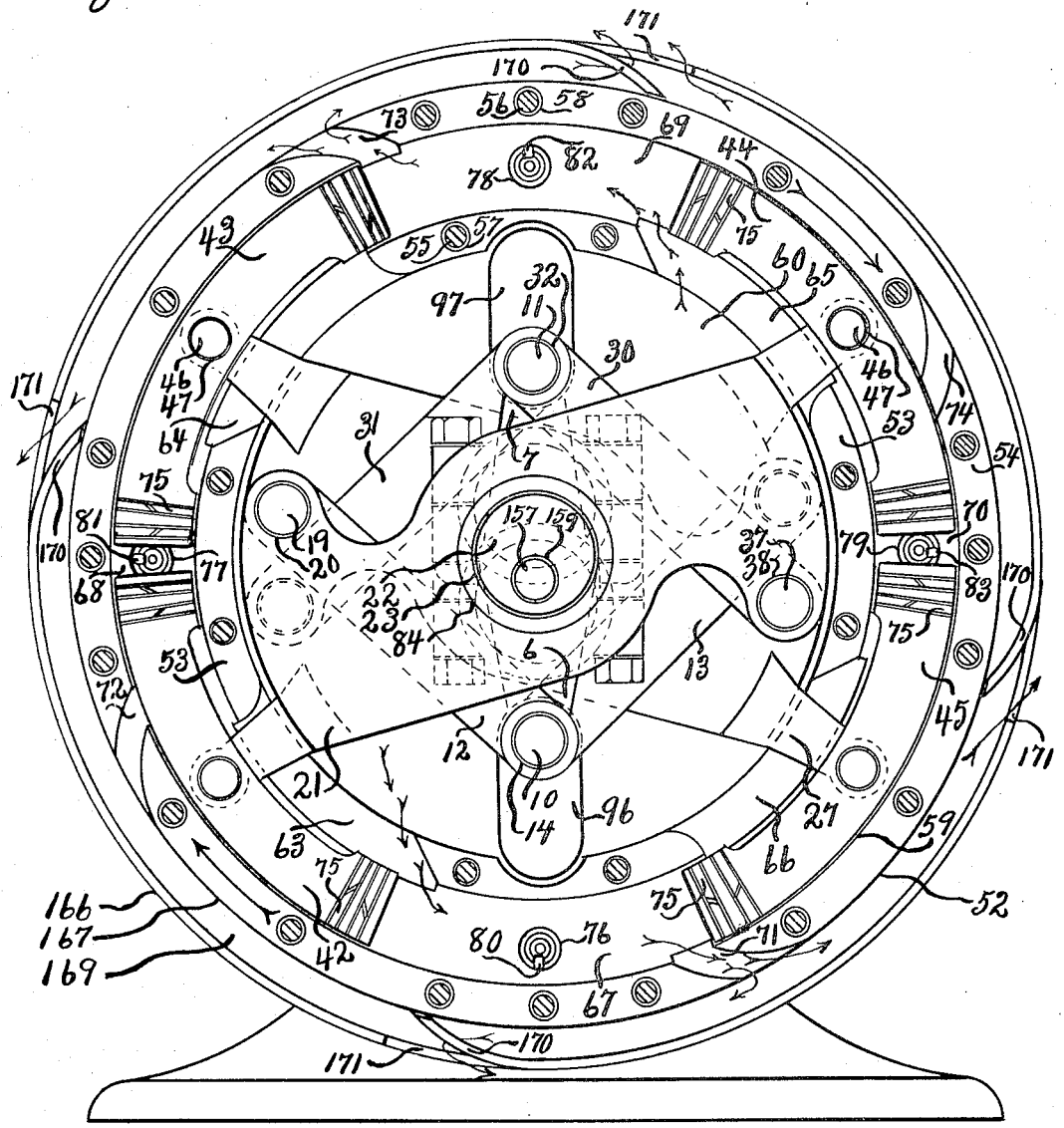
Figure 4:
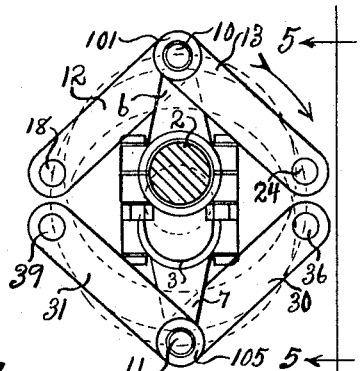
Figure 5:
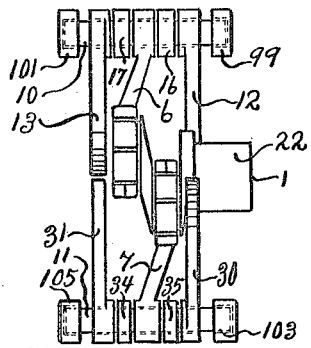
Figure 6:
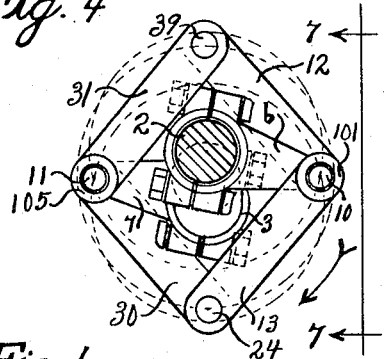
Figure 7:
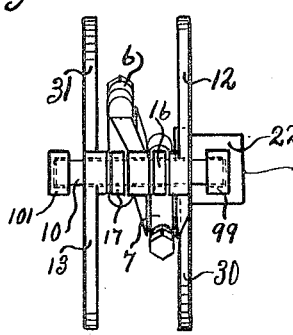
Figure 8:
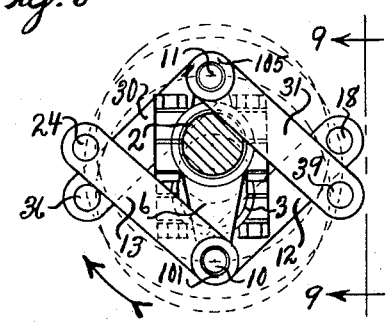
Figure 9:
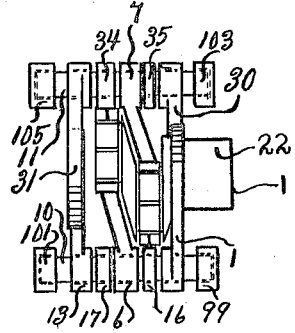
Figure 10:
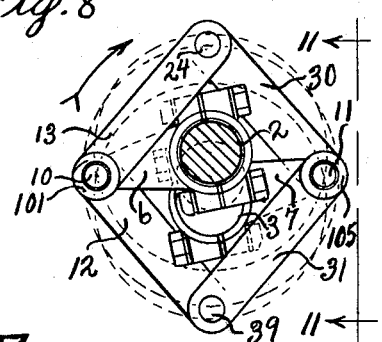
Figure 11:
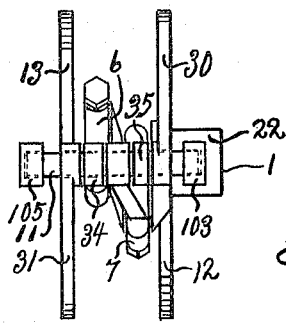
Figure 12:
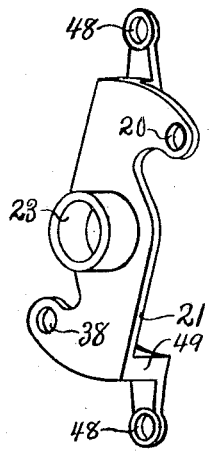
Figure 13:
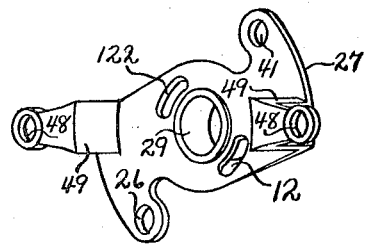
Figure 14:
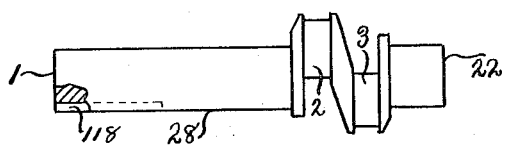
Figure 15:
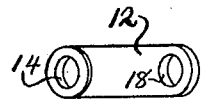
Figure 16:
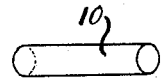
Figure 18:
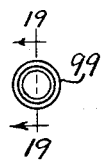
Figure 19:
Figure 17:
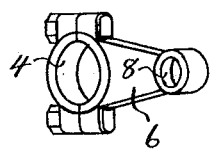
Figure 20:
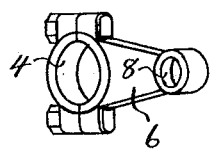
Figure 21:
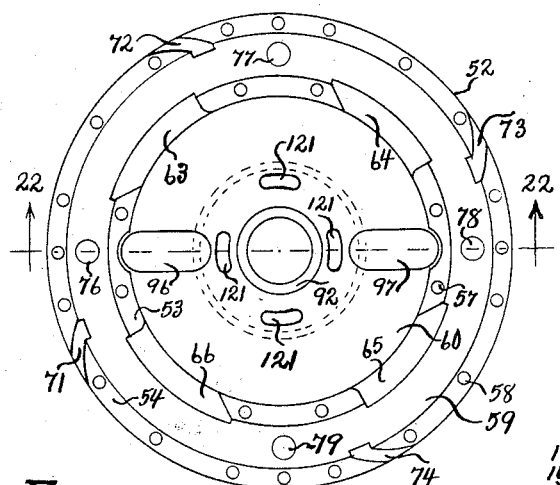
Figure 25:
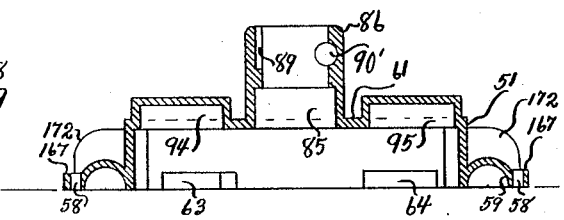
Figure 22:
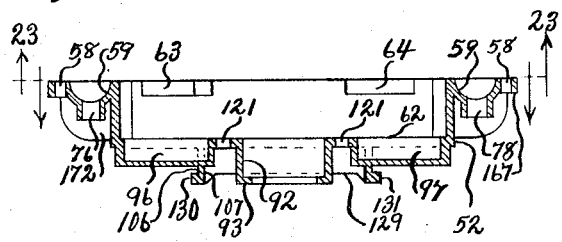
Figure 23:
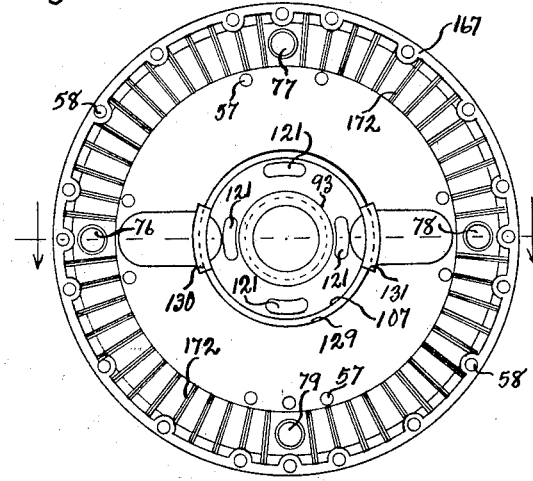
Figure 24:
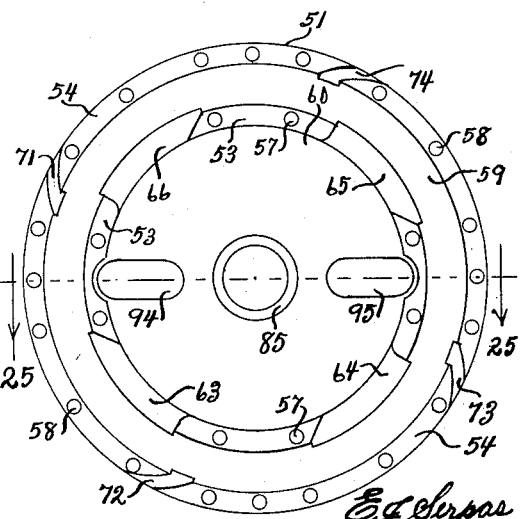
Figure 26:
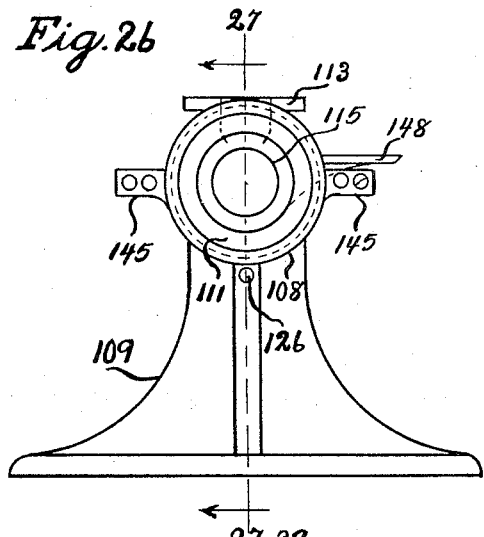
Figure 27:
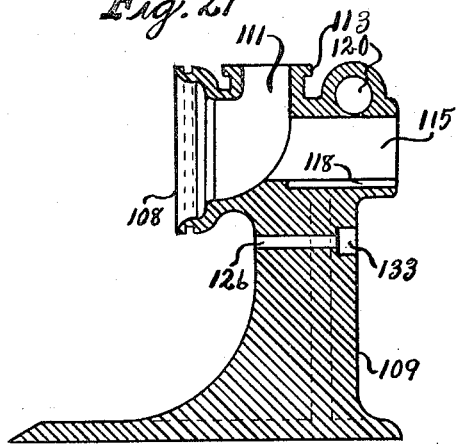
Figure 28:
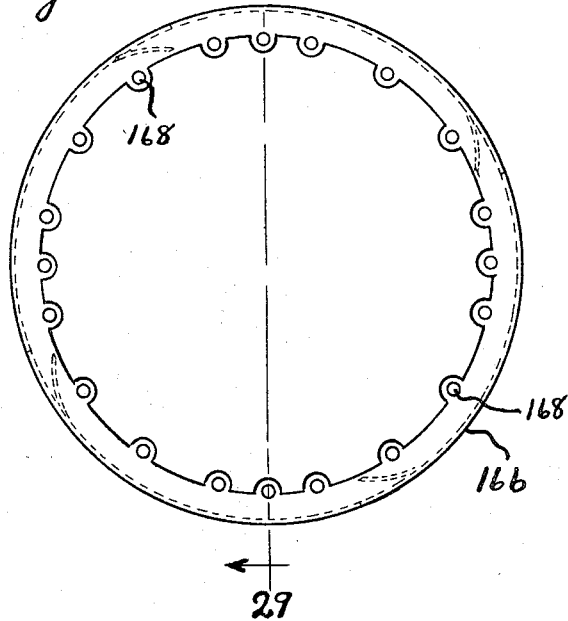
Figure 29:
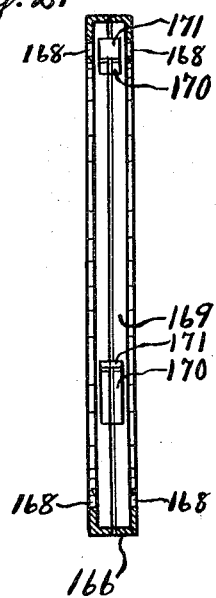
Figure 30:
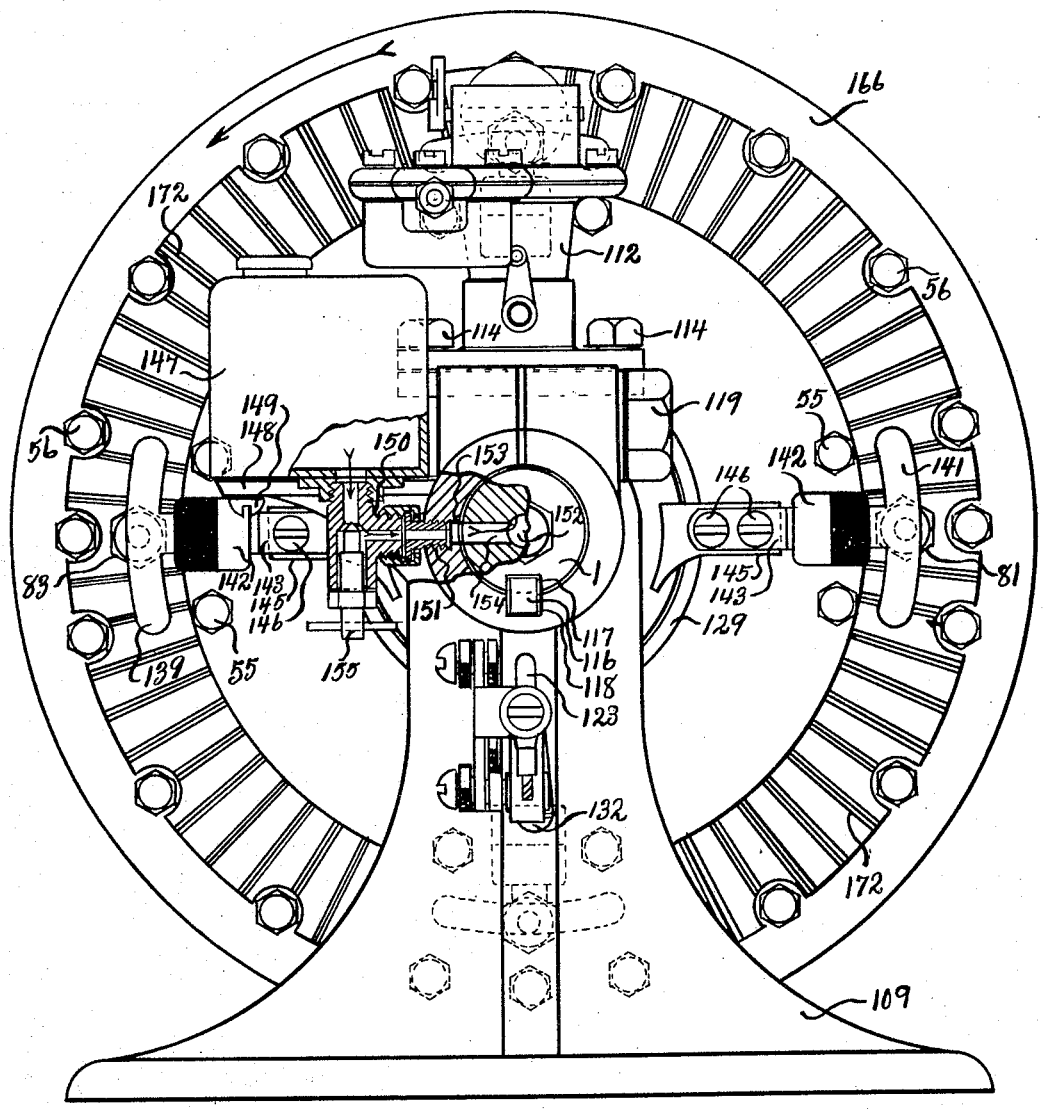

I attain these objects and other features by mechanism illustrated in the accompanying drawings in which Fig. 1 is a vertical section showing the engine as it appears after removing one of the castings; Fig. 2 is a longitudinal sectional view taken on line 2—2 of Fig. 1, showing in general the entire structure of the engine; Fig. 3 is a vertical sectional view of the engine as it appears after removing one of the castings and after revolving the rotor one half turn from the position shown in Fig. 1; Figs. 4 and 5, 6 and 7, 8 and 9, 10 and 11, are a series of views, on a reduced scale, showing the connecting rods and toggle joint links in four different positions as they revolve on the crank pins, and viewing the parts from the opposite end of the shaft to that shown in Fig. 1; Fig. 4 is a view of the connecting rods and toggle joint links shown in a position corresponding to that of the parts shown in Fig. 1; and Fig. 5 is an elevation taken on line 5—5 of Fig. 4, as it appears when looking in the direction of the arrows; Fig. 6 is a view of the connecting rods and toggle joint links in a position corresponding to that of the engine after being revolved one quarter of a turn from the initial position shown in Fig. 1; and Fig. 7 is an elevation taken on line 7—7 of Fig. 6, viewing the parts in the direction of the arrows; Fig. 8 is an elevation of the connecting rods and toggle joint links as they appear in a position corresponding to that of the parts, after revolving the entire casing or the engine one half turn from the initial position as shown in Fig. 1; and Fig. 9 is an elevation taken on line 9—9 of Fig. 8, looking in the direction of the arrows; Fig. 10 is an elevation of the connecting rods and toggle joint links in a position corresponding to that of the parts of the engine after being revolved three quarters of a turn from the initial position shown in Fig. 1; and Fig. 11 is an elevation taken on line 11—11 of Fig. 10. The following detailed views are also taken on a reduced scale. Fig. 12 is a detailed perspective view of one of the piston carrying arms; Fig. 13 is a detailed perspective view of the other one of the piston carrying arms engaged on the side of engine where the fuel mixture is admitted to the crank case, and the openings therein about the hub bore are to permit the entrance of the fuel mixture to the crank case; Fig. 14 is a detailed elevation of the crank shaft; Fig. 15 is a detailed perspective of one of the toggle joint links; Fig. 16 is a detailed perspective of the wrist pin shaft; Fig. 17 is a detailed perspective of one of the sleeve spaces used on the wrist pin shaft; Fig. 18 is a detailed elevation of one of the rollers engaged at each end of the wrist pin shaft; Fig. 19 is a detailed elevation taken on line 19—19 of Fig. 18; and Fig. 20 is a detailed perspective view of one of the connecting rods; Fig. 21 is a detailed elevation of one of the castings which forms the annular casing; Fig. 22 is a detailed sectional view taken on line 22—22 of Fig. 21; and Fig. 23 is a detailed elevation showing an opposite end view of the casting from that shown in Fig. 21, and is taken on line 23—23 of Fig. 22; Fig. 24 is a detailed elevation of the other casting which forms the annular casing; and Fig. 25 is a detailed sectional view of Fig. 24, taken on line 25—25; Fig. 26 is a detailed elevation of the engine support; Fig. 27 is a detailed sectional view taken on line 27—27 of Fig. 26; Fig. 28 is a detailed elevation of the muffler; and Fig. 29 is a detailed sectional view taken on line 29—29 of Fig. 28; Fig. 30 is an end view of the entire engine assembly.

Similar numbers refer to similar parts through the several views.

See Fig. 2, No. 1 indicates in general a stationary crank shaft provided with opposed crank pins 2 and 3 engaged in the bearings 4 and 5 of the connecting rods 6 and 7 respectively. The rods extend in opposite directions and their wrist pin bearing parts 8 and 9 lie in the same diametrical plane and they receive the wrist pin shafts 10 and 11 respectively which are tightly pressed through the bearings and extend longitudinally of the crank shaft 1.

Toggle joint links 12 and 13 are rotatably mounted on the wrist pin shaft 10 at their bearings 14 and 15 respectively and disposed thereon at both sides of the connecting rod 6 and suitably spaced thereon by the spacers 16 and 17. The free end of toggle joint link 12 extends in the direction of rotation and is provided with bearing 18 engaging pin 19 in the manner as shown in Fig. 1, where the arm 21 is partly cut away to show the connection. The pin 19 is tightly pressed into the opening 20 formed at a suitable radius in the piston carrying arm 21, which is shown in detail in Fig. 12, and is rotatably mounted on crank shaft portion 22 engaged in its hub bearing portion 23 in the manner illustrated in Fig. 2. The free end of toggle joint link 13 extends from the wrist pin shaft 10 in the opposite direction to that of rotation and is provided with bearing 24 engaging pin 25 tightly pressed into opening 26, shown in Fig. 13, formed in the piston carrying arm 27 at an equal radius to that of opening 20 in piston carrying arm 21. The piston carrying arm 27 is rotatably mounted on the crank shaft portion 28 engaged in its bearing part 29 as shown in Fig. 2 and so arranged as to have a degree of independent motion in respect to the piston carrying arm 21 and to rotate thereon said shaft.

See Fig. 2, the wrist pin 11 carries the toggle joint links 30 and 31 which are rotatably mounted thereon at their bearing portions 32 and 33 respectively and suitably spaced at both sides of the connecting rod 7 by the spacers 34 and 35. The free end of toggle joint link 30 diagrammatically outlined in Figs. 1 and 3 extends from the wrist pin 11 in the direction of rotation and is provided with the bearing 36 in the manner as shown in Figs. 4 and 6, engaged on the pin 37 tightly pressed into the opening 38 formed in the piston carrying arm 21 diametrically opposite and at an equal radius to that of the opening 20 as shown in Fig. 1 where the arm is partly cut away. The free end of toggle joint link 31 extends in the opposite direction to that of rotation and is provided with bearing 39 engaged on pin 40 tightly pressed in the opening 41 shown in Fig. 13, formed in the piston carrying arm 27 diametrically opposite and at equal radius to that of the opening 26.

The piston carrying arm 21 is provided with the pistons 42 and 44, while the piston carrying arm 27 is provided with the pistons 43 and 45. The pistons are carried diametrically opposite each other and coupled to the arms 21 and 27 by the piston pins 46 engaged in the opening 47 formed in the pistons and the openings 48 formed in the ends of the arms. The arms 21 and 27, disposed on the crank shaft and at opposite sides of the crank pins 2 and 3, are offset at 49 in order that the pistons all lie in a single plane.

Circular casing 50 is formed by the castings 51 and 52 secured together sealed tight at two annular points of contacts 53 and 54 by two circular rows of bolts 55 and 56 engaged in bolt openings 57 and 58 respectively. The cylindrical annular space enclosed by the casing 50 constitutes the piston chamber 59.

The discal space 60 formed between the discal wall portion 61 of the casting 51 and discal wall portion 62 of casting 52 surrounded by the cylindrical annular piston chamber 59 constitutes the crank case.

Four equally spaced elongated intake ports 63, 64, 65 and 66, formed between the castings 51 and 52 along the annular point of contact 53 connecting the crank case 60 to the inner most part of the annular piston chamber 59. They are adapted to receive and permit the passing of the fuel mixture and the piston carrying arms 21 and 27, which extends across the crank case 60, into the piston chamber 59 and are of sufficient length to permit a varying motion of the arms 21 and 27 relative to the castings 51 and 52.

The pistons 42, 43, 44 and 45, disposed in the piston chamber 59, span the intake ports 63, 64, 65 and 66 in such order that their rear end part cover and uncover the rear end of the ports so that communication of the crank case 60 to the firing chambers 67, 68, 69 and 70 is established at their forward end, or their ends in the direction of rotation.

The exhaust ports 71, 72, 73 and 74 formed between the castings 51 and 52 and cutting through their annular point of contact 54 connected to the piston chamber 59 at its outer periphery and are so located as to be covered and uncovered by the forward ends of the pistons in order to release the exhaust gases from the rear end and at the greatest radius of the firing chambers.

In order to seal the firing chambers 67, 68, 69 and 70, sealing rings 75 are provided at each end of the pistons 42, 43, 44 and 45.

Spark plug ports 76, 77, 78 and 79 are provided equally spaced in the casing 50 and formed in the casting 52 communicating with the firing chambers 67, 68, 69 and 70 respectively receiving the spark plugs 80, 81, 82 and 83 respectively which are consequently carried by the casing 50 and provided for igniting the fuel mixture.

The casting 51 is rotatably mounted on the hub portion 84 of the piston carrying arm 21 received in the bore 85 formed in the hub part 86 of the casting 51 which extends and receives drive shaft 87 fixed therein by the key 88, engaging the key seat 89 and lock pin 90 engaged in the opening 90'; while the casting 52 is rotatably mounted on hub part 91 of the piston carrying arm 27 received in the bore 92 formed in the hub 93 of the casting and are both arranged in this order to permit rotation of same.

Radial grooves 94 and 95 formed in the discal wall portion 61 of the casting 51 extend radially and both lie in the same diametrical plane and parallel to radial grooves 96 and 97 formed in the discal wall portion 62 of casting 52 serve as a cross head guide for the connecting rods 6 and 7 and for applying the power delivered from the pistons to revolve the casing 50 and consequently the drive shaft through sliding connection of the wrist pin 10 having its end portion 98 provided with roller 99 engaging the radial groove 94 and its end portion 100 provided with roller 101 engaged in the radial groove 96, and through sliding connection of the wrist pin 11 provided at its end portion 102 with the roller 103 engaged in the radial groove 95 and its end 104 provided with roller 105 engaged in the radial groove 97.

In order to convey the fuel mixture to the engine a tubular shaped extension 106 is formed at one side of the casting 52 and concentrically bored at 107 to receive stationary intake manifold 108 formed on the engine support 109 which freely enters therein and is provided with ring 110 to seal the rotary connection at this point. The intake manifold 108 forms an L shaped chamber 111 connected to the carburetter 112 which is secured to the manifold at its flange portion 113 by the bolts 114.

The crank shaft end portion 28 extends through the L shaped intake manifold 108 and engages anchor bearing 115 formed in the engine support 109 and keyed there in a fixed position by key 116 engaged in the key seat 117 formed in the end portion 28 of crank shaft 1 and the key seat 118 formed in the anchor bearing 115. The clamp bolt 119 provided in the opening 120, is provided for locking the crank shaft 1 to prevent any lateral motion of same therein and to facilitate a lateral adjustment of the engine in respect to the engine support 109.

The openings 121 in the discal wall portion 62 of the casting 52 and in the tubular shaped extension 106 around the hub 93, and the openings 122 in the piston carrying arm 27 are provided to connect the L chamber 111 to the crank case 60 for conducting the fuel mixture therein.

The ignition points 123 and 124 are provided to interrupt the ignition primary circuit and are operated by the ignition shaft 125 engaged in the opening 126 formed in the engine support 109 provided with eccentric head portion 127 which is urged by spring 128 disposed thereon the shaft between the support 109 and the sleeve 128' towards and against the rim portion 129 of the tubular shaped extension 106 carrying the ignition cams 130 and 131 diametrically opposite each other which are adapted to actuate the ignition shaft 125 against the tension of the spring 128.

Spark advance lever 132 is rotatably mounted in the engine support 109 at 133 receiving the end 134 of the ignition shaft 125 which abuts the contact point at 134' and is provided with the leaf spring 135, secured thereto the arm by screw 136, and is also engaged in opening 137 formed in the end 134 of the ignition shaft 125 for locking the arm thereto and limiting the return travel of the shaft 125 urged by spring 128 and facilitates rotation of the shaft 125 consequently the eccentric head 127 and thereby controlling the advancing and retarding of the ignition.

In order to distribute the electric current to the spark plugs 80, 81, 82 and 83 the electrodes 138, 139, 140 and 141 are provided all in a circular row and at a ninety degree angle apart and supported by rubber insulators 142 carried by the metal supports 143. The electrode 138 supported and fixed to the carburetter 112 and electrode 140 fixed to the engine support 109 at 144 transmits an electric current to the plugs 80, and 82 to fire the fuel mixture into the firing chambers 67 and 69; and the electrodes 139 and 141, supported by the arms 145 and secured thereto by the screw bolts 146, are to supply an electric current to the plugs 81 and 83 to ignite the fuel mixture in the chambers 68 and 70 simultaneously.

In order to lubricate the engine an oil reservoir 147 secured to bracket 148, an integral part of the engine support 109, by bolt 149 is provided with outlet pipe connections 150 and 151 connecting the interior of the oil reservoir with the central oil conduit 152 in the crank shaft 1 through opening 153 in the anchor bearing 115 registering with opening 154 drilled across the crank shaft. The amount of lubrication permitted to pass the engine is controlled by the screw valve 155. Central conduit 152 extends longitudinally in the crank shaft 1 and connects with the oil pump barrel 156 engaged by the oil pump plunger 157 provided with spring 158 engaged thereon and seated in the recess 159 in the end 22 of crank shaft 1 and expanding against the shoulder portion 160 of the plunger 157 urging the plunger against the end of the drive shaft 87.

Cam 161 in the end of the drive shaft 87 is provided for actuating plunger 157 in order to pulsate the oil. The groove 162 is provided at one side of the oil pump plunger 157 to permit passage of oil into the recess 159 to lubricate bearing 23 through the oil opening 163 and the oil openings 164, in the crank pins 2 and 3, provide lubrication for the connecting rod bearings 4 and 5 and the opening 165 provides lubrication for the bearing 29 in the piston carrying arm 27.

Muffler 166 secured to the flange portions 167 of the castings 51 and 52 bolted thereto by the circular row of bolts 56 engaging the bolt openings 168 formed in the muffler, the vacuum chamber 169 formed by the muffler at the periphery of the castings 51 and 52 which is directly connected to the four exhaust ports 71, 72, 73 and 74, the impellers 170 formed in the vacuum chamber 169 extending from the periphery of the flanges 167 curved in the opposite direction to that of rotation and terminating in the rear ends of the exhaust openings 171 formed in the outmost periphery of the muffler, are for the purpose of evacuating and muffling the exhaust.

In order to cool the engine the fins 172 are formed in the castings 51 and 52.

It is obvious that when the casing 50 is given an impulse and rotated in the direction indicated by the arrow from the position shown in Fig. 1, that through the action of wrist pin shafts 10 and 11 engaged in the radial grooves 94 and 96, 95 and 97 respectively and connected to the piston carrying arms 21 and 27 and consequently to the pistons 42 and 43, 44 and 45 through connection of the toggle joint links 12 and 13, 30 and 31 respectively, and connected to the crank pins 2 and 3 by the rods 6 and 7 causes the entire central mechanism to revolve along with the casing.

Naturally the revolving of the rods 6 and 7 on the crank pins 2 and 3 respectively causes them to exert to pull the wrist pin shafts 10 and 11 radially in towards the center of the engine thus acting on the toggle joint links 12 and 30, coupled opposite each other to the piston carrying arm 21, causing them to expand in the direction of rotation imposing a positive acceleration to the speed of the piston carrying arm 21 and consequently the pistons 42 and 44, while the links 13 and 31 extend in the opposite direction to that of rotation and coupled diametrically opposite each other to the piston carrying arm 27 imposes a negative acceleration to the arm and consequently the pistons 43 and 45 thus causing expansion of the spaces constituting the firing chambers 67 and 69 while at the same time causing contraction of the spaces constituting the firing chambers 68 and 70 throughout the first half revolution.

As the engine revolves passing out of the first half turn and into the second half turn of the circle an alternation of the magnitude of the acceleration of the piston carrying arms 21 and 27 and consequently the pistons occur due to the reverse action of the crank pins 2 and 3 exerting a pushing force outwardly on the wrist pin shafts 10 and 11 through the rods 6 and 7 thus reversing the action of the links 12 and 30, 13 and 31 causing them to retract and therefore impose a negative acceleration to the piston carrying arm 21 and pistons 42 and 44 and a positive acceleration to the piston carrying arm 27 and consequently the pistons 43 and 45, thus causing the spaces constituting the firing chambers 68 and 70 to expand while causing the spaces constituting the firing chambers 67 and 69 to contract throughout the last half of the circle.

It is obvious that the centrifugal force caused by rotating the engine tends to evacuate the medium from the muffler chamber 169, the firing chambers 67, 68, 69 and 70, and the crank case 60, through the ports 171 in the outer periphery of the muffler, the exhaust ports 71, 72, 73 and 74, and the intake ports 63, 64, 65 and 66, as the pistons uncover and establish registration of the ports in regular order, causing the fuel mixture to flow from the carburettor through the L chamber 111 through the openings 121 and 122 and into the crank case 60.

Assuming that the engine is now revolving and nearing the end of the second half turn of the circle, or a little in advance to the position as that shown in Fig. 1, where the rear end of piston 43 uncovers the intake port 64 connecting the forward end of the firing chamber 68 to the crank case 60, and the forward end part of piston 42 uncovers the exhaust port 72 connecting the rear end of the firing chamber 68 to the muffler chamber 169, thus the centrifugal action tending to evacuate the muffler chamber 169 through the muffler ports 171 causes the fuel mixture to flow through the intake port 64 into the firing chamber 68 sweeping the medium ahead of it through the exhaust port 72 into the muffler chamber 169 and out through the muffler ports 171.

Obviously the firing chamber 70 diametrically opposite the chamber 68 is subjected simultaneously to the same cycle as that of the chamber 68. The action of the piston 45 uncovering the intake ports 66 connecting the forward end of the firing chamber 70 to the crank case 60 and the forward end of the piston 44 uncovering the exhaust port 74 connecting the rear end of the firing chamber 70 to the muffler chamber 169 causes the fuel mixture to flow into the firing chamber 70 sweeping the medium ahead of it out through the axhaust port 74 into the muffler chamber 169 and out through the muffler ports 171. This action continues as the engine revolves out of and a little beyond the second half of the circle at which time the pistons 42 and 43, 44 and 45, covers out the registration of the ports 64 and 72, 66 and 74.

The fuel mixture in the firing chambers 68 and 70 is now being compressed as the engine revolves again in the first half turn of the circle due to the action of the central mechanism as previously explained, imposing a positive acceleration on the piston carrying arm 21 and the pistons 42 and 44 and a negative acceleration on the piston carrying arm 27 and the pistons 43 and 45 relative to the speed of the casing 50 causing the spaces constituting the explosion chambers 68 and 70 and the fuel mixture contained therein to contract and reaching the highest magnitude of compression just as the engine passes out of the first half and into the second half of the circle, or in the position as that shown in Fig. 3. The spark plug 81 at this point registers contact with the electrode 141 and the spark plug 83 registers contact with the electrode 139, shown in Fig. 30, and the ignition cam 130 at this point engaging the eccentric head 127 actuating the ignition shaft 125 causing its end portion 134 to abut the contact point 123 at 134' breaking the electric contact at 124 causing electrical oscillation of an ignition coil and inducing an electric current to flow simultaneously to the electrode 139 the spark plug 83 and the electrode 141 to the spark plug 81 thus igniting the fuel mixture in the firing chambers 68 and 70 simultaneously.

Obviously the explosion in the chambers 68 and 70 expending between the pistons 42 and 43, 44 and 45 tends to revolve the engine through connection of the piston carrying arms 21 and 27 to the crank pins 2 and 3 by action of the toggle joints and the wrist pin shaft connection to the casing.

A little in advance to the position as shown in Fig. 3, or the position reached by the engine as it revolved to the end of the first half circle where the ignition action occurred, the rear ends of the pistons 42 and 44 uncovered registration of the intake ports 63 and 65 connecting the crank case 60 to the forward end of the firing chambers 67 and 69, and the forward ends of the pistons 43 and 45 uncover registration of the ports 71 and 73 connecting the rear ends of the firing chambers 67 and 69 to the muffler chamber 169. The action of centrifugal force tending to evacuate the chamber 169 through communication of muffler ports 171 to the atmosphere causes the fuel mixture in the crank case 60 to flow through the intake ports 63 and 65 and into the firing chambers 67 and 69 simultaneously and sweeping the medium ahead of it through the exhaust ports 71 and 73 into the chamber 169 and out the muffler ports 171, as the engine revolves out of and a little beyond the first half turn of the circle.

At this position we may assume that the engine is running on its own power from the impulses of the explosions in the firing chambers 68 and 70.

As the engine revolves in the second half turn of the circle, the intake ports 63 and 65 and the exhaust ports 71 and 73 are covered out of registration with the crank case 60 and the muffler chamber 169. The fuel mixture in the chambers 67 and 69 is then being compressed simultaneously, due to the facts which have been previously understood, the central mechanism imposes in this cycle, a negative acceleration to the piston carrying arm 21 and the pistons 42 and 44 and a positive acceleration to the piston carrying arm 27 and the pistons 43 and 45 causing the spaces constituting the explosion chambers 67 and 69 and the fuel mixture therein to contract thus compressing the fuel mixture throughout the second half and to the beginning of the first half turn of the circle; at this point the fuel mixture in the chambers reaches its highest magnitude of compression and is ignited by the spark plug 80 in the chamber 67 registering contact with the electrode 138 and the spark plug 82 in the chamber 69 registering contact with the electrode 140 which are supplied simultaneously with an electric current induced by an ignition coil subjected at this point to a current interruption caused by the engagement of the ignition cam 131 acting on the eccentric head 127 of the ignition shaft 125 causing the shaft to move laterally and its end portion 134 to abut the contact point 123 at 134' thus breaking the primary circuit at 124, it is obvious that the engine is given two double impulses per complete turn and as the cycles repeat themselves the engine continues to revolve.

While I have shown my invention as embodied in a rotary internal combusion motor it is obvious that in some of its aspects it might be applicable to engines other than the internal combustion type.

It is of course understood that various changes and modifications may be made in details of construction and designs of the above specifically described embodiment of the invention without departing from the spirit thereof. Such changes and modifications are restricted only by the scope of the following claims.

What I claim is:

1. A rotary internal combustion engine comprising a base, a crankshaft fixed relative to said base, a casing rotatably mounted on said crankshaft, said casing including an inner chamber enclosing said crankshaft, an annular chamber carried by said casing about said inner chamber, a plurality of pistons in said annular chamber operatively engaged to said casing and said crankshaft, said annular chamber forming firing chambers between said pistons, said annular chamber having intake ports connecting the forward and innermost part of each of said firing chambers to said inner chamber, said annular chamber further having exhaust ports connecting the rear and outermost part of each of said firing chambers to the atmosphere, and means to supply fuel mixture to said inner chamber.

2. A rotary internal combustion engine comprising a base, a crankshaft fixed relative to said base, a casing rotatably mounted on said crankshaft, said casing including an inner chamber enclosing said crankshaft, means associated with said inner chamber for supplying fuel mixture thereto, an annular chamber carried by said casing about said inner chamber, a plurality of pistons in said annular chamber operatively engaged to said casing and said crankshaft, said annular chamber forming firing chambers between said pistons, said firing chambers having intake ports connecting the forward and innermost part of each of said firing chambers to said inner chamber, said firing chambers further having exhaust ports leading from the rear and outermost part of each of said firing chambers to the outer periphery of said casing, an exhaust manifold secured to and engaged about said casing and communicating at its inner side with said exhaust ports, said exhaust manifold having a plurality of exhaust ports provided with one wall thereof inclined inwardly in the direction of rotation.

3. A rotary internal combustion engine comprising a base, a crankshaft fixed relative to said base, a casing rotatably mounted on said crankshaft, said casing including an inner chamber enclosing said crankshaft, said inner chamber having a pair of diametrically disposed inlet openings in one side thereof, a stationary intake manifold about said crankshaft opening in the direction of and associated with said inlet openings, an annular chamber carried by said casing about said inner chamber, a plurality of pistons in said annular chamber operatively engaged to said casing and said crankshaft and dividing the annular chamber into firing chambers between said pistons, said annular chambers having intake ports connecting the forward and innermost part of each of said firing chambers to said inner chamber and further having exhaust ports leading from the rear and outermost part of each of said firing chambers to the outer periphery of said casing, an exhaust manifold secured to and engaged about said casing and communicating at its inner side with said exhaust ports, said exhaust manifold having a plurality of exhaust ports provided with one wall thereof inclined inwardly in the direction of rotation.

4. In a rotary internal combustion engine having a base, a crankshaft fixed to the base, a casing rotatably mounted on the crankshaft and providing an annular firing chamber and an inner chamber about the crankshaft, a plurality of pairs of pistons in the firing chamber, and transmission means for rotating the casing when firing occurs between adjacent pistons; hollow annular exhaust means secured at the periphery of said casing, said casing having exhaust ports opening from the firing chamber into the exhaust means, said exhaust means having an annular space to receive the exhaust from said firing chamber and having peripheral ports to the atmosphere displaced circumferentially from said exhaust ports, and impellers in the annular space of said exhaust means located just behind the peripheral ports relative to the direction of rotation, said impellers being inclined inwardly in the direction of rotation whereby rotation of the casing and exhaust means lowers the pressure in said annular space.

5. In a rotary internal combustion engine having a base, a crankshaft fixed to the base, a casing rotatably mounted on the crankshaft and providing an annular chamber and an inner chamber about the crankshaft, and a plurality of pairs of coupled pistons in the annular chamber providing a plurality of firing chambers between adjacent pistons; means for supplying a fuel mixture to said inner chamber, said annular chamber having spaced ports in its inner wall located to open into the adjacent firing chambers only in certain piston positions, said annular chambers further having spaced ports in its outer wall located to open into the adjacent firing chambers only in certain piston positions, means for reducing pressure at the ports in said outer wall when the casing rotates, and means for coordinating the pistons to open and close the ports for each firing chamber together whereby the reduced pressure at the port in the outer wall of the chamber draws fuel mixture from the inner chamber of the casing through the port in the inner wall of the chamber.

6. In a rotary internal combustion engine as recited in claim 5, said ports in the inner and outer walls of said chamber being located respectively at the front and rear ends of the firing chambers relative to the direction of rotation of the casing, whereby the rotation of the casing assists in exhausting the firing chambers and in recharging them with fuel mixture.

7. In a rotary internal combustion engine as recited in claim 5, said ports in the inner and outer walls of said chamber being located respectively at the front and rear ends of the firing chambers relative to the direction of rotation of the casing, and said ports being inclined outwardly and backwardly relative to the direction of rotation of the casing, whereby the inertia of the gases in the firing chamber assists in exhausting themselves and the inertia of the incoming fuel mixture causes it to sweep the firing chamber and fill the same.

8. In a rotary internal combustion engine having a base, a crankshaft fixed to the base, a casing rotatably mounted on the crankshaft and providing an annular chamber and an inner chamber about the crankshaft, and a plurality of pairs of coupled pistons in the annular chamber providing a plurality of firing chambers between adjacent pistons; means for supplying a fuel mixture to said inner chamber, said annular chamber having spaced ports in its inner wall located to open into the adjacent firing chambers only in certain piston positions, said annular chambers further having spaced ports in its outer wall located to open into the adjacent firing chambers only in certain piston positions, an annular exhaust manifold secured at the periphery of said annular chamber, said manifold enclosing the said ports in the outer wall of the chamber, said manifold having in its outer wall exhaust ports open to the atmosphere and located between the said ports in the outer wall of the chamber, means in the manifold for directing exhaust gas therein out of said exhaust ports, and means for coordinating the pistons to open and close the ports for each firing chamber together.

ERNEST J. SERPAS.